July 15, 1924.
E. G. HARRIS
AUTOMOBILE ELEVATOR
Filed July 6, 1923
1,501,599
2 Sheets-Sheet 2
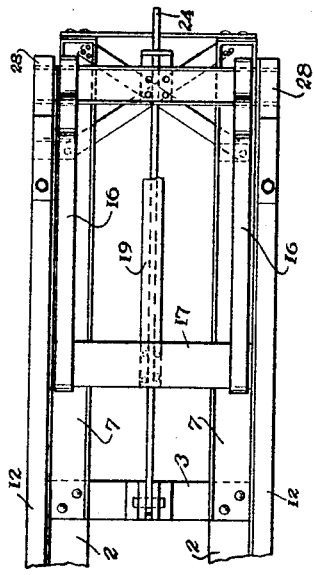
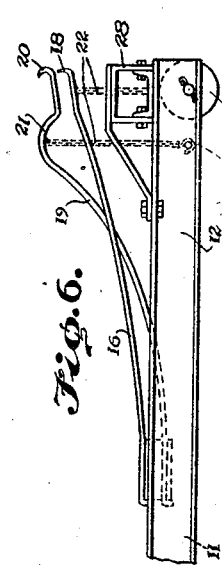
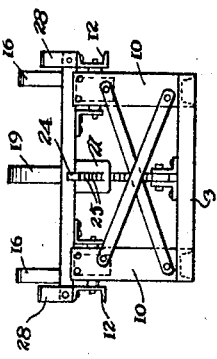
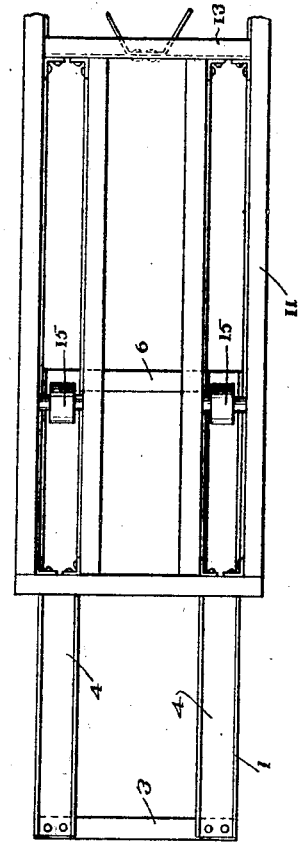
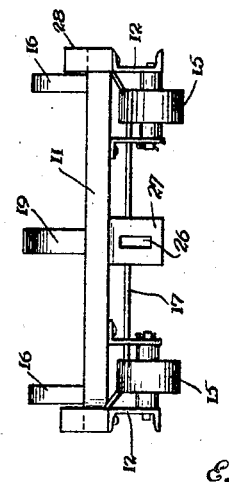
Inventor
E. G. Harris.
By Eccleston & Eccleston.
Attorneys Patented July 15, 1924.

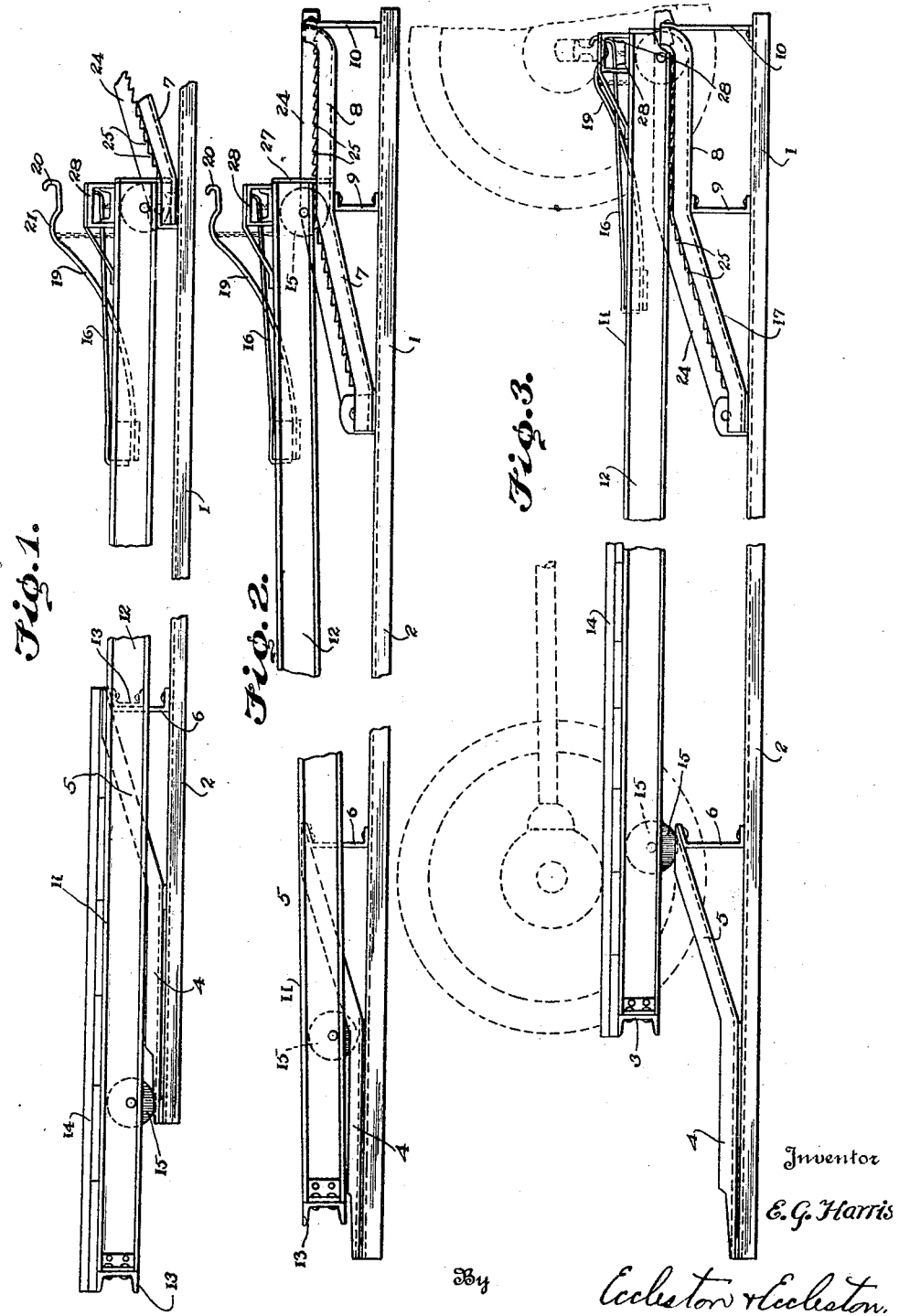

1,501,599

UNITED STATES PATENT OFFICE.

ELIZABETH G. HARRIS, OF LOS ANGELES, CALIFORNIA.

AUTOMOBILE ELEVATOR.

Application filed July 6, 1923. Serial No. 649,889.

*To all whom it may concern:*

Be it known that I, ELIZABETH G. HARRIS, a citizen of the United States, residing at Los Angeles, in the county of Los Angeles and State of California, have invented certain new and useful Improvements in Automobile Elevators, of which the following is a full, clear, and exact description.

My invention relates to apparatus for raising automobiles or other vehicles a sufficient distance above the floor of the garage or the like to permit ready access to the same in making repairs or doing other work in connection with automobiles. An object of the invention is to generally improve elevators of the type having inclined runways and a carriage for co-operation with the runways, and which is operated automatically by the power or momentum of the vehicle to be raised.

A further object of the invention resides in the construction of such an elevator which will successfully operate with practically all types of automobiles now on the market.

Other objects and advantages of the invention will be apparent from the following description when taken in connection with the accompanying drawings, in which:

Figure 1 is a side elevation of the device partly broken away.

Figure 2 is a view similar to Figure 1, showing the parts in a slightly different position.

Figure 3 is a view similar to Figure 1, showing the carriage completely elevated.

Figure 4 is a plan view of the device partly broken away.

Figure 5 is a front elevation of the carriage.

Figure 6 is a side elevation of the front portion of the carriage, and

Figure 7 is a front elevation of the base or trackway.

Referring to the drawings more in detail, the numeral 1 indicates the base structure of the apparatus and comprises the longitudinal members 2 and transverse brace members 3. Suitably secured to the side members 2 at the rear ends thereof are the channel members 4 which terminate in the upwardly inclined portions 5 supported by the standard 6. These channel members 4 provide suitable tracks for the rear wheels of a carriage to be later described.

At the forward end of the base structure 1 are secured the channel members 7 which form tracks for the forward wheels of the carriage and which are inclined upwardly and then continued in a horizontal direction, as indicated at 8. The forward ends of the horizontal portions are curved upwardly on a radius somewhat greater than the radius of the carriage wheels to provide a gradual stop for the latter. Standards 9 and 10 are provided for supporting the tracks 7—8 in elevated position.

For co-operation with the base structure and tracks I have provided a carriage indicated generally by the numeral 11 and comprising a substantially rectangular frame formed of longitudinally extending channel members 12 and transverse channel members 13. A floor or platform 14 is secured to the rear end of the carriage frame 11 for the purpose of receiving the differential housing of the vehicle being lifted. The carriage is supported on wheels 15 which ride on the tracks 4 and 7 previously described and which are suitably journaled in the channel members 12 of the carriage.

In order that the carriage may be engaged and carried forward by the vehicle being lifted, I have provided a pair of leaf springs 16 secured to each side of the carriage on the crossbar 17. These springs are inclined upwardly, but are substantially straight and are provided at their forward ends with hooks 18. Intermediate the springs 16 and also mounted on the crossbar 17 is a third spring 19 provided with a hook 20 and an upwardly curved or cam portion 21. The resiliency of the spring arms 16 and 19 normally holds them in the inclined positions shown in Figure 6, but they may be drawn down to inoperative position and held by chains 22 which terminate in hooks 23, and which may be passed around a portion of the carriage and secured to itself.

Pivotally mounted on the base structure 1 is a ratchet bar 24 provided with teeth 25. This bar extends through an aperture 26 in the downwardly extending plate 27 mounted on the forward end of the carriage 11 and co-operates therewith to prevent backward movement of the carriage.

Supporting blocks 28 are secured to each of the channel members 12 of the carriage at the forward ends thereof and provide suitable rests for the front axle of the vehicle being raised.

In operation, the carriage being in the position shown in Figure 1, the vehicle is driven forward and its front axle will engage the hooked ends of the springs 16 or 19 and draw the carriage forward with it. The distance between the inclined tracks 5 and 7 is such that the forward wheels 15 of the carriage will first ride up the incline 7, thus permitting the rear wheels to remain on the ground and give a forward movement of the vehicle during a part of the lifting movement. The rear wheels 15 of the carriage now reach the foot of the inclined tracks 5 and the remainder of the lifting movement is completed by the momentum of the vehicle, the front wheels of the carriage, of course, continuing along the track 8. During this movement of the carriage the ratchet bar 24 slides through the plate 27 and will prevent a backward movement thereof. To lower the vehicle it is only necessary to raise slightly the ratchet bar 24 and push the vehicle and carriage backward, the lowering movements of the carriage being reversed. As the carriage reaches the end of its backward movement the brace 13 will engage the standard 6 of the base structure and form a stop for the carriage.

A few types of automobiles are constructed with drip pans, etc., which extend beyond the front axle of the automobile, and, in order to prevent damage to the same through engagement with the hooks 18 and 20, the springs 16 are drawn down and secured in operative position by the chains 22 when raising such cars; the cam 21 on the spring 19 will cause the hook 20 to be lowered, however, and thus avoid contact with the drip pans, etc.

From the foregoing description taken in connection with the accompanying drawings it will be seen that I have provided a strong and durable automobile elevator of the type described; that it is adapted to practically all makes of automobiles, and that by the arrangement of inclines the forward part of the automobile may be raised while the driving wheels remain on the ground.

In accordance with the patent statutes, I have described what I now believe to be the best embodiment of the invention, but I do not wish to be understood thereby as limiting myself or the scope of the invention, as many changes and modifications may be made without departing from the spirit of the invention; all such I aim to include in the scope of the appended claims.

What I claim as new and desire to secure by Letters Patent is:

1. In a vehicle elevator, including inclined tracks and a carriage for co-operation therewith, an inclined resilient member secured to the forward end of said carriage, a projection on the forward end of said member, and a cam portion carried by said member intermediate the ends thereof and adapted to be engaged by a portion of the vehicle being raised.

2. In a vehicle elevator, including inclined tracks and a carriage for co-operation therewith, an inclined leaf spring having one end secured to said carriage, a lug on the free end of said leaf spring, and an upwardly curved portion on said spring intermediate the ends thereof adapted to be engaged by a portion of the vehicle being raised.

3. In a vehicle elevator, including inclined tracks and a carriage for co-operation therewith, a pair of inclined resilient members secured to the carriage at the sides thereof, and a third resilient member secured to the carriage intermediate the first named resilient members, one of said resilient members being provided with a cam intermediate its ends and the other resilient members being substantially straight, and hooks formed on the ends of all of said resilient members.

4. In a vehicle elevator, including inclined tracks and a carriage for co-operation therewith, a plurality of upwardly inclined spring members having one end secured to the forward end of said carriage, hooks formed on the free ends of said spring members, a cam formed on one of said members intermediate the ends thereof, and means for securing any of said spring members in inoperative position.

ELIZABETH G. HARRIS.